US012694696B2

(12) United States Patent
Wang et al.

(10) Patent No.: US 12,694,696 B2
(45) Date of Patent: Jul. 28, 2026

(54) FOOD STATUS RECOGNITION AND DISPLAY SYSTEM AND FOOD STATUS RECOGNITION AND DISPLAY METHOD

(71) Applicant: PRIMAX ELECTRONICS LTD., Taipei City (TW)

(72) Inventors: Hsiu-Wen Wang, Taipei City (TW); Chih-Wen Lin, Taipei City (TW)

(73) Assignee: PRIMAX ELECTRONICS LTD., Taipei City (TW)

( * ) Notice: Subject to any disclaimer, the term of this patent is extended or adjusted under 35 U.S.C. 154(b) by 211 days.

(21) Appl. No.: 18/404,944

(22) Filed: Jan. 5, 2024

(65) Prior Publication Data

US 2025/0124728 A1     Apr. 17, 2025

(30) Foreign Application Priority Data

Oct. 16, 2023     (TW) ................................. 112139413

(51) Int. Cl.
| | |
|---|---|
| *G06V 20/68* | (2022.01) |
| *G06V 10/143* | (2022.01) |
| *G06V 20/10* | (2022.01) |
| *G06V 20/52* | (2022.01) |

(52) U.S. Cl.
CPC ............ *G06V 20/68* (2022.01); *G06V 10/143* (2022.01); *G06V 20/188* (2022.01); *G06V 20/52* (2022.01)

(58) Field of Classification Search
None
See application file for complete search history.

(56) References Cited

U.S. PATENT DOCUMENTS

| | | | |
|---|---|---|---|
| 2016/0057394 A1* | 2/2016 | Marutani | ................ F25D 23/12 |
| | | | 348/143 |
| 2020/0097776 A1* | 3/2020 | Kim | ........................... G06T 7/70 |
| 2023/0375476 A1* | 11/2023 | Vasefi | ........................ H04L 9/50 |

FOREIGN PATENT DOCUMENTS

WO     WO-2016133175 A1 *   8/2016   ............... G06T 7/60

* cited by examiner

*Primary Examiner* — James M Anderson, II
(74) *Attorney, Agent, or Firm* — WPAT, PC

(57)     ABSTRACT

A food status recognition and display system and a food status recognition and display method are provided. The food status recognition and display system includes a camera and light source module, a processing module and a display interface. The camera and light source module faces a food storage environment. After the camera and light source module photographs at least one food item using the light beams in a visible light band, a near-infrared light band and a short-wave infrared light band, respective food photography results are obtained. The processing module receives the food photography results. After the food photography results are processed through an image recognition process, a vegetation index formula, a vegetation water content formula and a vegetation correlation analysis formula, at least one corresponding food status information is generated and then transmitted.

14 Claims, 3 Drawing Sheets

100

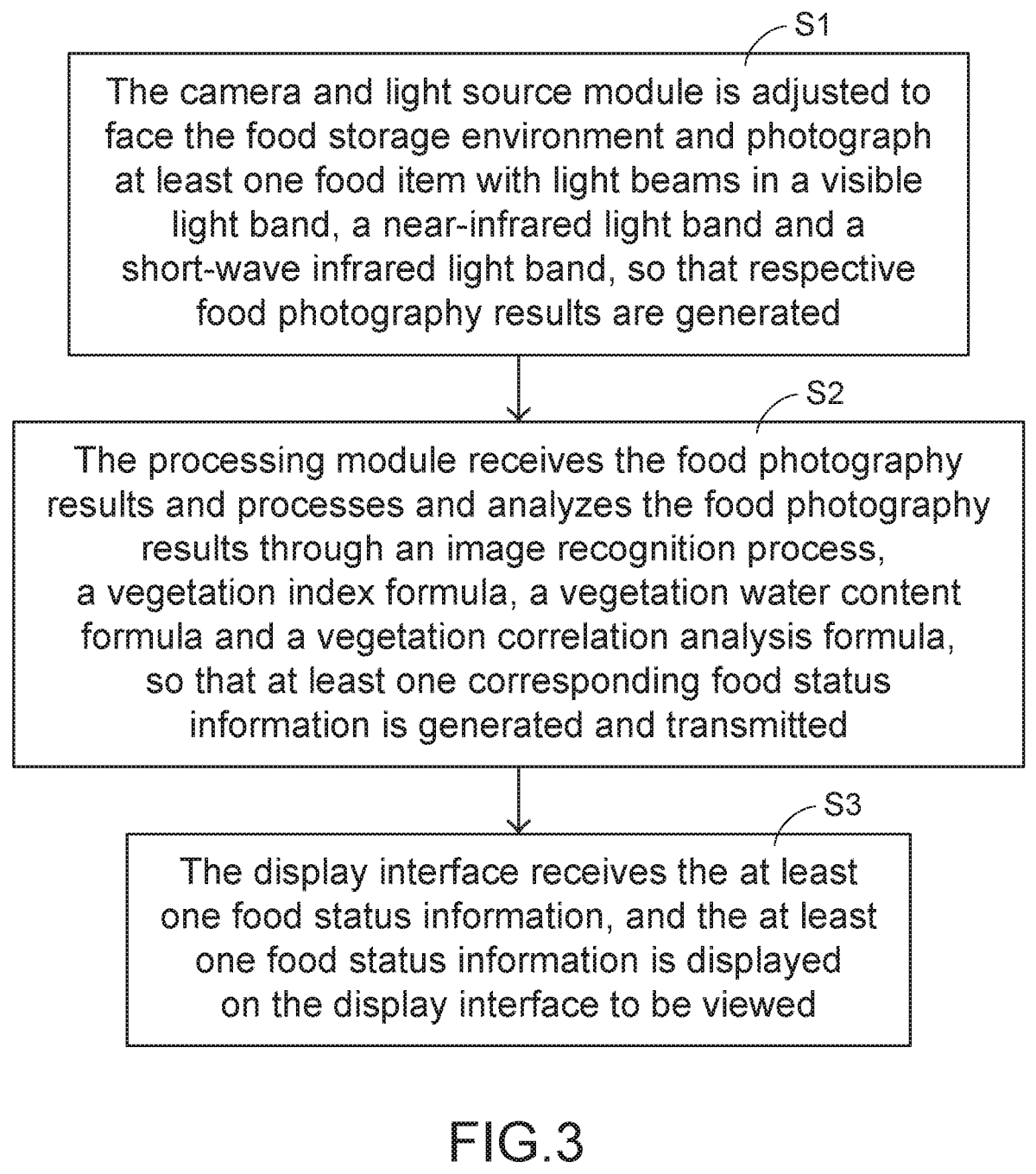

S1

The camera and light source module is adjusted to face the food storage environment and photograph at least one food item with light beams in a visible light band, a near-infrared light band and a short-wave infrared light band, so that respective food photography results are generated

S2

The processing module receives the food photography results and processes and analyzes the food photography results through an image recognition process, a vegetation index formula, a vegetation water content formula and a vegetation correlation analysis formula, so that at least one corresponding food status information is generated and transmitted

S3

The display interface receives the at least one food status information, and the at least one food status information is displayed on the display interface to be viewed

FIG.3

FOOD STATUS RECOGNITION AND DISPLAY SYSTEM AND FOOD STATUS RECOGNITION AND DISPLAY METHOD

FIELD OF THE INVENTION

The present invention relates to a food status recognition and display system and a food status recognition and display method for the food status recognition and display system, and more particularly to a food status recognition and display system and a food status recognition and display method for analyzing food photography results according to a vegetation index formula, a vegetation water content formula and a vegetation correlation analysis formula.

BACKGROUND OF THE INVENTION

Nowadays, in the busy industrial and commercial social environment, people usually have meals outside. However, some people still choose to cook at home, or they prepare some food items at home. Under this circumstance, refrigerators with freezing and fresh-keeping functions have become the best equipment for modern people to store fish, vegetables, fruits and other related food items or foods.

With the development of science and technology, the most advanced refrigerators now can not only provide the freezing and fresh-keeping functions of traditional refrigerators to maintain low temperatures but also further possess the information providing functions of so-called smart refrigerators.

For example, after food items or foods are put in the refrigerator, people often forget the time when the food items or foods are put, and it is difficult for people to understand the freshness levels of the food items or foods. However, this type of smart refrigerator can provide users with information about the statuses of the food items or the foods by integrating related photography, detection and network transmission technologies. Consequently, users do not need to rely solely on their own observation or memorization to pay attention to the food items or foods. Since the possibility of spoiling the food items or foods is reduced, the purpose of preventing waste can be achieved.

Conventionally, the smart refrigerator has to be equipped with plural photographing lenses (i.e., color cameras) or plural microwave or infrared light sensors (i.e., not color cameras) to capture visible light images or infrared light images of food items or food for analysis. Consequently, the fabricating cost is increased. Moreover, the conventional technologies of analyzing some food items or foods (e.g., vegetables) still have some drawbacks. For example, the accuracy of judging the freshness levels of the vegetables is usually affected by their types or colors.

In order to improve the associated technologies and allow users to recognize the statuses of the stored food items or foods, it is important to provide a food status recognition and display system and a food status recognition and display method.

SUMMARY OF THE INVENTION

An object of the present invention provides a food status recognition and display system and a food status recognition and display method for the food status recognition and display system. In the system and the method of the present invention, the food photography results are analyzed through a vegetation index formula, a vegetation water content formula and a vegetation correlation analysis formula. Consequently, the freshness levels, the statuses or the realities of the vegetables or fruits can be recognized more accurately.

In accordance with an aspect of the present invention, a food status recognition and display system is provided. The food status recognition and display system includes a camera and light source module, a processing module and a display interface. The camera and light source module faces a food storage environment. The camera and light source module photographs at least one food item in the food storage environment by using light beams in a visible light band, a near-infrared light band and a short-wave infrared light band. Consequently, respective food photography results are generated. The processing module receives the food photography results. After the processing module processes and analyzes the food photography results through an image recognition process, a vegetation index formula, a vegetation water content formula and a vegetation correlation analysis formula, at least one corresponding food status information is generated and then transmitted. The display interface receives the at least one food status information. The at least one food status information is shown on the display interface so as to be viewed.

In accordance with another aspect of the present invention, a food status recognition and display method for a food status recognition and display system is provided. The food status recognition and display system includes a camera and light source module, a processing module and a display interface. The food status recognition and display method includes the following steps. Firstly, the camera and light source module face a food storage environment, and the camera and light source module photographs at least one food item in the food storage environment by using light beams in a visible light band, a near-infrared light band and a short-wave infrared light band. Consequently, respective food photography results are generated. Then, the processing module receives the food photography results. After the processing module processes and analyzes the food photography results through an image recognition process, a vegetation index formula, a vegetation water content formula and a vegetation correlation analysis formula, at least one corresponding food status information is generated and then transmitted. Then, the display interface receives the at least one food status information. The at least one food status information is shown on the display interface so as to be viewed.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 3 is a flowchart of a food status recognition and display method according to an embodiment of the present invention.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides a food status recognition and display system and a food status recognition and display method for the food status recognition and display system. An example of the food status recognition and display system and an example of the food status recognition and display method will be described as follows.

Figure 1:
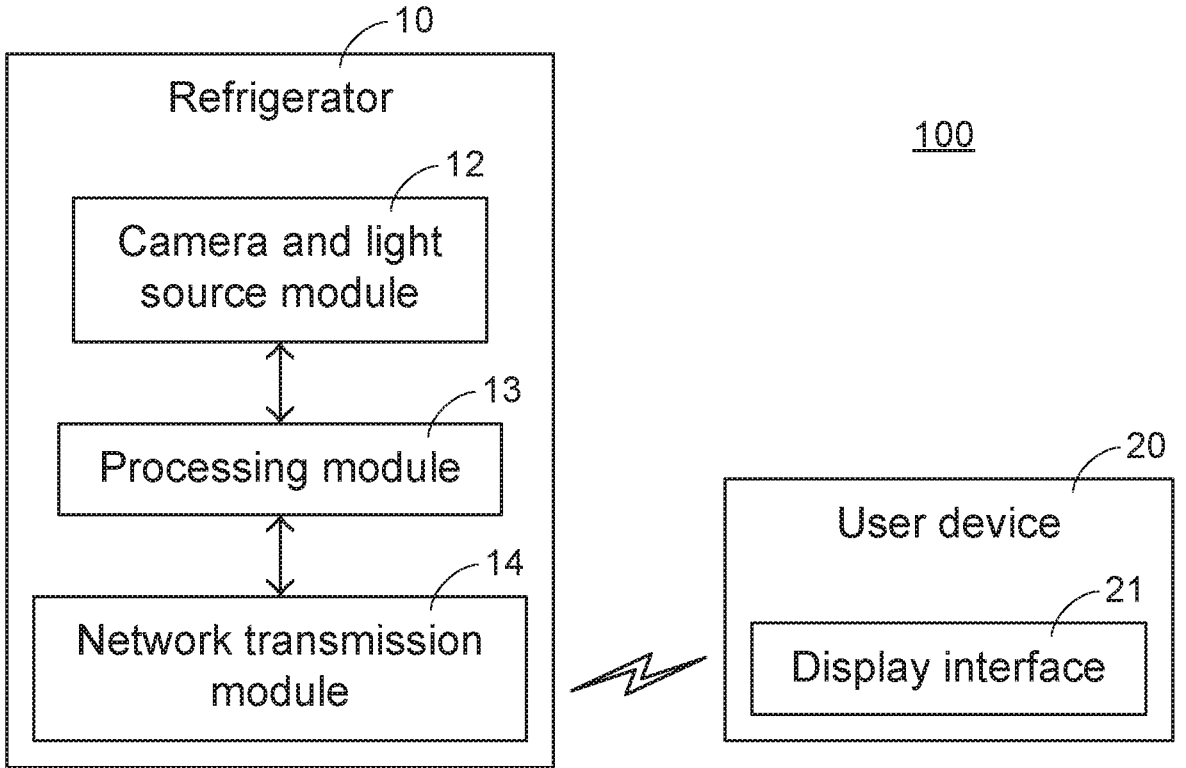
FIG. 1 is a schematic functional block diagram illustrating a food status recognition and display system according to an embodiment of the present invention.
Figure 2:
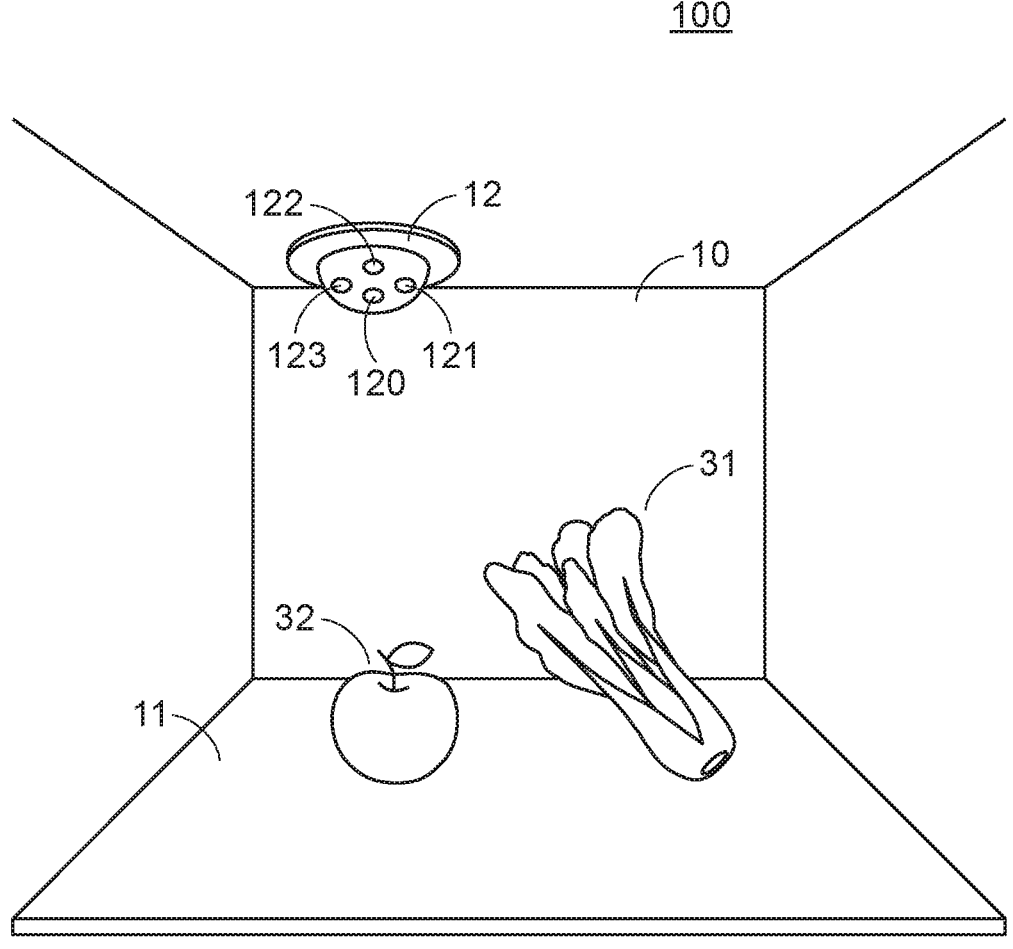
FIG. 2 schematically illustrates an implementation example of the food status recognition and display system.

Please refer to FIGS. 1 and 2. FIG. 1 is a schematic functional block diagram illustrating a food status recognition and display system 100 according to an embodiment of the present invention. FIG. 2 schematically illustrates an implementation example of the food status recognition and display system 100. As shown in FIGS. 1 and 2, the food status recognition and display system 100 comprises a refrigerator 10, a camera and light source module 12 and a user device 20. A food storage environment 11 is formed in the refrigerator 10. The food storage environment 11 is used for storing at least one food item. The camera and light source module 12 is disposed within the refrigerator 10. In addition, the camera and light source module 12 faces the food storage environment 11.

In order to implement the food status recognition and display functions, the food status recognition and display system 100 further comprises a processing module 13, a network transmission module 14, and a display interface 21. In this embodiment, the processing module 13 and the network transmission module 14 are installed in the refrigerator 10. The processing module 13 is in communication with the camera and light source module 12 and the network transmission module 14. The processing module 13 receives, processes, and analyzes a food photography result from the camera and light source module 12. After the food photography result is processed and analyzed, the processing module 13 generates the corresponding food status information and transmits the corresponding food status information through the network transmission module 14.

In an embodiment, the display interface 21 is a display screen installed on the user device 20. The user device 20 is an electronic device with network transmission functions and processing functions. For example, the user device 20 is a smart phone, a tablet computer, a desktop computer, or a wearable electronic device. After the user device 20 receives the corresponding food status information from the network transmission module 14 of the refrigerator 10, the food status information is shown on the display interface 21 for the user to view. In an embodiment, the food status information is transmitted in a wired transmission manner or a wireless transmission manner. The method of transmitting the food status information is determined according to the type of the used network equipment.

In accordance with a feature of the present invention, the camera and light source module 12 comprises plural light sources 121, 122, 123 and a camera 120. The lens of the camera 120 is a wide-angle lens module or a fisheye lens module. Consequently, the camera 120 can capture images with a larger field of view or a larger imaging area. In other words, regardless of the location of the camera and light source module 12 within the refrigerator 10, the camera and light source module 12 can capture the entire image of the food storage environment 11.

Please refer to FIG. 2 again. The food storage environment 11 can store many food items. For illustration, only two food items are stored in the food storage environment 11.

The two food items include a vegetable 31 and a fruit 32. In accordance with another feature of the invention, the camera and light source module 12 captures the images of the stored food items by using the light beams in different wavelength bands. For example, the camera and light source module 12 photographs the stored food items by using the light beams in a visible light band, a near-infrared (NIR) light band and a short-wave infrared (SWIR) light band. Consequently, respective food photography results are generated. The food photography results include a visible light image signal, a near-infrared light image signal and a short-wave infrared light image signal.

In order to achieve the purpose of capturing imaging in various light bands, the camera and light source module 12 comprises a visible light source 121, a near-infrared light source 122 and a short-wave infrared light source 123. In addition, the camera 120 comprises a lens, a visible light sensing chip, a near-infrared light sensing chip and a short-wave infrared light sensing chip, which are not shown in the drawings. Consequently, the camera 120 can photograph and sense the stored food items in the visible light band, the near-infrared light band and the short-wave infrared light band and generate the respective food photography results. For example, the wavelength of the near-infrared light band is approximately in a range between 850 and 940 nanometers (nm), and the wavelength of the short-wave infrared light band is approximately in a range between 1200 and 1500 nanometers (nm).

In the sensing period of the camera 120, the visible light source 121, the near-infrared light source 122 and the short-wave infrared light source 123 are enabled to emit light beams according to a specified sequence. For example, a white light beam, a near-infrared light beam and a short-wave infrared light beam are emitted sequentially. Then, the reflected light beams from the stored food items are sequentially received by the visible light sensing chip, the near-infrared light sensing chip and the short-wave infrared light sensing chip. According to the received light beams, the camera 120 generates the respective food photography results. In other words, these food photography results include a visible light image signal, a near-infrared light image signal and a short-wave infrared light image signal.

The present invention can also use alternative designs to achieve the same or similar short-wave infrared (SWIR) sensing effects. For example, in another embodiment, the camera and light source module 12 uses a single chip design (e.g., a hyperspectral camera). Under this circumstance, the camera and light source module 12 comprises an integrated multi-spectral sensing chip that integrates the sensing functions in the visible light band, the near-infrared light band and the short-wave infrared light band. The integrated multi-spectral sensing chip generates the visible light image signal, the near-infrared light image signal and the short-wave infrared light image signal.

In accordance with a further feature of the present invention, after the processing module 13 receives the food photography results, the processing module 13 accesses and executes relevant firmware or program codes to process and analyze the food photography results. For example, the processing module 13 processes and analyzes the food photography results through an image recognition process, a vegetation index formula (e.g., a normalized difference vegetation index (NDVI) formula), a vegetation water content formula (e.g., a normalized difference water index (NDWI) formula) and a vegetation correlation analysis formula. Consequently, at least one corresponding food status information is generated and then transmitted.

Especially, the food status recognition and display method of the present invention is provided to recognize the freshness levels or statuses of the food items (e.g., vegetables and fruits). The freshness levels or statuses of the food items are related to the good condition or the bad condition (e.g., the bruising, rotting or dehydration condition).

FIG. 3 is a flowchart of a food status recognition and display method according to an embodiment of the present invention. The food status recognition and display method comprises the following steps.

Firstly, in a step S1, the camera and light source module 12 is adjusted to face the food storage environment 11, and the camera and light source module 12 photographs at least one food item with light beams in a visible light band, a near-infrared light band and a short-wave infrared light band, so that respective food photography results are generated. Then, in a step S2, the processing module 13 receives the food photography results and processes and analyzes the food photography results through an image recognition process, a vegetation index formula, a vegetation water content formula and a vegetation correlation analysis formula, so that at least one corresponding food status information is generated and transmitted. Then, in a step S3, the display interface 21 receives the at least one food status information, and the at least one food status information is displayed on the display interface 21 to be viewed.

As mentioned above, in the step S1, the food photography results include a visible light image signal, a near-infrared light image signal and a short-wave infrared light image signal. In addition, the visible light image signal contains a red light image signal, a green light image signal and a blue light image signal. For example, the freshness levels or statuses of vegetables and fruits are recognized by using the red light image signal in the visible light image signal.

In the step S2, the image recognition process comprises the following steps. Firstly, the visible light image signal is loaded. Then, the visible light image signal is subjected to image correction and extraction and classified into one or more regions of interest (ROI) in a default model. Consequently, the food item names corresponding to the images of the regions of interest are determined. Furthermore, the image recognition process uses the existing artificial intelligence technologies and pattern recognition technologies to perform real-time object detection and deep learning operations. Consequently, the photographed object can be recognized according to the food photography results.

For example, the default model is a YOLO (You Only Look Once) model, a ResNet-50 (Deep Residual Neural Network) model, or a CNN (Convolutional Neural Networks) model. As mentioned above, the camera 120 of the camera and light source module 12 uses a wide-angle lens or a fisheye lens to capture images with a larger field of view or a larger imaging area. However, the edge of the image captured by the wide-angle lens module or the fisheye lens module may be suffered from distortion or aberration. After the images in the food photography results are corrected through the image processing method, the corrected images are close to the real images. Then, the images of the regions of interest in the food photography results are captured through the image recognition process in the default model. Consequently, one or more meaningful targets to be recognized are classified. After the targets to be recognized are identified, the types of the stored food items can be determined.

In the step S2, the vegetation index formula is expressed as the following mathematic formula $$NDVI = (NIR - RED)/(NIR + RED). \qquad (1)$$

In the mathematic formula (1), RED is the red light image signal, NIR is the near-infrared light image signal, and NDVI is a vegetation index. In other words, the vegetation index NDVI is obtained after the value of the near-infrared light image signal NIR minus the red light image signal RED is divided by the value of the near-infrared light image signal NIR plus the red light image signal RED.

In an embodiment, the size of the near-infrared light image signal NIR and the size of the red light image signal RED are equal. For example, each of the near-infrared light image signal NIR and the red light image signal RED is an 8-bit image signal or a 16-bit image signal. Consequently, the near-infrared light image signal NIR and the red light image signal RED can be added to each other or subtracted from each other. The size of the image signal is related to the sensing capability of the camera and light source module 12. In the mathematic formula (1), the vegetation index NDVI is a numerical value that does not exceed 1 (i.e., in the range between −1 and 1). Nowadays, the applications of the vegetation index formula are well known. Generally, the vegetation index NDVI closer to 1 indicates a higher chlorophyll content. That is, the vegetation condition is good. In contrast, the vegetation index NDVI farther from 1 indicates the lower chlorophyll content. That is, the vegetation condition is bad.

In an embodiment, the vegetation index NDVI is related to the freshness level of the food item. In case that the difference between 1 and the vegetation index NDVI falls within a specified range, the corresponding food status information represents the high freshness level of the food status. In case that the difference between 1 and the vegetation index NDVI is beyond the specified range, the corresponding food status information represents the low freshness level of the food status. The specified range may be determined according to the practical requirements.

For example, the vegetable 31 shown in FIG. 2 is a Chinese cabbage, a water spinach or sweet potato leaves. According to the vegetation index formula, the effective and appropriate food status information can be provided.

In the step S2, the vegetation water content formula is expressed as the following mathematic formula $$NDWI = (NIR - SWIR)/(NIR + SWIR). \qquad (2)$$

In the mathematic formula (2), SWIR is the short-wave infrared light image signal, NIR is the near-infrared light image signal, and NDWI is a vegetation water content. In other words, the vegetation water content NDWI is obtained after the value of the near-infrared light image signal NIR minus the short-wave infrared light image signal SWIR is divided by the value of the near-infrared light image signal NIR plus the short-wave infrared light image signal SWIR.

Similarly, the size of the near-infrared light image signal NIR and the size of the short-wave infrared light image signal SWIR are equal. Consequently, the near-infrared light image signal NIR and the short-wave infrared light image signal SWIR can be added to each other or subtracted from each other. In the mathematic formula (2), the vegetation water content NDWI is a numerical value that does not exceed 1 (i.e., in the range between −1 and 1). Nowadays, the applications of the vegetation water content formula are well known. Generally, the vegetation water content NDWI closer to 1 indicates a higher water content. That is, the vegetation condition is good. In contrast, the vegetation water content NDWI farther from 1 indicates the lower water content. That is, the vegetation condition is bad.

In an embodiment, the vegetation water content NDWI is related to the freshness level of the food item. In case that the difference between 1 and the vegetation water content NDWI falls within a specified range, the corresponding food status information represents the high freshness level of the food status. In case that the difference between 1 and the vegetation water content NDWI is beyond the specified range, the corresponding food status information represents the low freshness level of the food status. The specified range may be determined according to the practical requirements.

For example, the fruit 32 shown in FIG. 2 is an apple, a cantaloupe or a watermelon. According to the vegetation water content formula, the effective and appropriate food status information can be provided.

In the above embodiment, the food status is recognized by using the suitable mathematic formula after the name or type of the stored food item is identified. For example, if the food item is the vegetable 31, the vegetation index formula is used for food status recognition. In contrast, if the food item is the fruit 32, the vegetation water content formula is suitably used for the food status recognition. In an embodiment, both of the two mathematic formulae are used to recognize the food status of the same food item.

Generally, the chlorophyll content and the water content in a vegetable are highly related to each other. For example, in case that the chlorophyll content in the food item is higher, the water content in the food item is also higher. Alternatively, in case that the food item is fresher, both of the chlorophyll content and the water content are higher. That is, in the food status recognition result of the same food item, the vegetation index NDVI and the vegetation water content NDWI are positively correlated. Consequently, the vegetation correlation analysis formula is designed to examine the relationship between the vegetation index NDVI and the vegetation water content NDWI. According to the vegetation correlation analysis formula, the applicability of the generated food status information can be confirmed.

The vegetation correlation analysis formula is related to the correlation analysis about the relationship between the vegetation index NDVI and the vegetation water content NDWI. That is, the vegetation correlation analysis formula is used to obtain a vegetation correlation coefficient. As mentioned above, the vegetation index NDVI and the vegetation water content NDWI are related to image signals. Assuming that x is any pixel point in the image signal corresponding to the vegetation index NDVI and y is any pixel point in the image signal corresponding to the vegetation water content NDWI, the vegetation correlation analysis formula may be expressed as follows:

$$r = \frac{n\sum xy - (\sum x)(\sum y)}{\sqrt{\left[n\sum x^2 - (\sum x)^2\right]\left[n\sum y^2 - (\sum y)^2\right]}} \qquad (3)$$

As mentioned above, the image signals for obtaining the vegetation index NDVI and the vegetation water content NDWI have the same size. For example, in the mathematic formula (3), each of the image signals for obtaining the vegetation index NDVI and the vegetation water content NDWI has n pixel points. In addition, r represents the vegetation correlation coefficient.

In the mathematic formula (3), the vegetation correlation coefficient r is obtained through various operations (e.g., addition, multiplication, square, subtraction, multiplication, square root, and division) on each pixel point x of the image signal corresponding to the vegetation index NDVI and each pixel point y of the image signal corresponding to the vegetation water content NDWI. The obtained vegetation correlation coefficient r is a numerical value that does not exceed 1 (i.e., in the range between −1 and 1). Nowadays, the applications of the vegetation correlation analysis formula are well known. Generally, the vegetation correlation coefficient r closer to 1 indicates a stronger correlation between the vegetation index NDVI and the vegetation water content NDWI. In contrast, the vegetation correlation coefficient r farther from 1 indicates a weaker correlation between the vegetation index NDVI and the vegetation water content NDWI.

In case that the difference between 1 and the vegetation correlation coefficient r falls within a specified range, there is a positive correlation between the vegetation index NDVI and the vegetation water content NDWI. In other words, the food status information corresponding to the vegetation index NDVI or the food status information corresponding to the vegetation water content NDWI can be suitably adopted. Similarly, the specified range may be determined according to the practical requirements.

In case that the difference between 1 and the vegetation correlation coefficient r is beyond the specified range, the vegetation index NDVI and the vegetation water content NDWI are not highly correlated. However, it does not mean that the results of the vegetation index NDVI or the vegetation water content NDWI are incorrect. Generally, the vegetation index formula is suitably used for recognizing vegetables, and the vegetation water content formula is suitably used for recognizing fruits. In addition, there are various types of vegetables and fruits. Consequently, either the vegetation index formula or the vegetation water content formula is feasible for recognizing the statuses of some of the vegetables or fruits.

In some situations, the correlation coefficient is low. Under this circumstance, the food photography result is analyzed through the vegetation index formula or the vegetation water content formula, or the process of identifying the name or type of the stored food item is repeatedly done. As known, not all vegetables and fruits contain chlorophyll. Generally, chlorophyll is present in plant leaves. Since red, yellow and purple fruits and vegetables primarily contain carotenoids and anthocyanins and have less chlorophyll, other formulae will be suitably adopted to analyze its food photography result. As mentioned above, red, yellow and purple fruits and vegetables primarily contain carotenoids and anthocyanins and have less chlorophyll. According to the pigment wavelength characteristics of the varieties, the textures of these fruits and vegetables can be recognized through the red light, the near-infrared light, the short-wave infrared light and the light in some other possibly spectra by using an image gradient analysis method. Alternatively, an image contrast analysis method can be used to determine the brightness values of these fruits and vegetables, and the freshness levels or statuses will be recognized according to the brightness levels.

Generally, after fresh fruits and vegetables are placed in the refrigerator, the rate of chlorophyll synthesis in the leaf tissues will slow down because the temperature in the environment is decreased. As the number of cold storage days increases, the moisture in the leaf tissue begins to decrease, and decomposition also begins to occur at the low temperature. Since the synthesis rate is lower than the decomposition rate, the chlorophyll content gradually decreases. However, carotenoids are more stable when compared with chlorophyll pigments. After chlorophyll disappears, carotenoids can still be present in the leaves. In other words, xanthophylls and carotenes in the leaves will gradually dominate in the cold storage environment. Consequently, the light beams in the blue light band and blue-green light band will be absorbed. Specially, the food photography results obtained by using the light beams in the spectral range between 570 nm and 680 nm are suitably used for recognition. Due to the concepts of the present invention, the vegetation index formula or the vegetation water content formula can be used more flexibly through the multi-band sensing method according to the image analysis on the textures and the brightness levels of the vegetables or fruits.

In the above embodiment, the mathematic formulae (1), (2), and (3) represent the vegetation index formula, the vegetation water content formula and the vegetation correlation analysis formula, respectively. In other embodiments, the vegetation index formula, the vegetation water content formula and the vegetation correlation analysis formula may be modified or altered while retaining the teachings of the present invention. The modifications or alterations of these mathematic formulae can obtain the similar or identical food status recognition efficacy.

As mentioned above, the food status recognition and display method of the present invention are provided to primarily recognize vegetables, fruits or associated food items. It is noted that the applications of the food status recognition and display method are not restricted. For example, the food status recognition and display method of the present invention is also suitable for recognizing meat, fish, or any other appropriate type of food items. Similarly, the image recognition process is firstly used to identify the food item type according to the captured images. If the food item is meat, fish, or another type of food item, the food item type is recognized according to the result of judging whether the visible light image signal complies with a food database.

For example, if a greater portion of the captured meat image is fresh red, the corresponding food status information represent that the food is fresh. Whereas, if a greater portion of the captured meat image is black, the corresponding food status information represent that the food is not fresh.

In the above embodiment, the food storage environment 11 is disposed within the refrigerator 10. It is noted that numerous modifications and alterations may be made while retaining the teachings of the invention. For example, in some other embodiments, the food storage environment is a food exhibition area in a supermarket, a traditional market or a store. The user device is a mobile electronic device such as a smart phone, a tablet or a wearable electronic device. The camera and light source module, the processing module and the display interface are installed on the user device. In addition, the processing module of the user device accesses and executes relevant firmware or program codes to implement the food status recognition and display functions.

In a usage scenario, the user with a mobile electronic device visits a food exhibition area in a supermarket, a traditional market or a store, and the user uses the camera and light source module of the mobile electronic device to photograph the exhibited food items. After the processing module will receive, process, and analyze the food photography result, the corresponding food status information is shown on the display interface (i.e., the display screen) for the user to view. According to the food status information, the user can realize the freshness levels of the associated food items and determine whether the food items will be purchased or not.

As mentioned above, modern people are less likely to cook by themselves or lack experience in purchasing food items in their busy business and industrial lives. When people need to choose and purchase food items on their own, the food status recognition and display system and the food status recognition and display method of the present invention provide useful food status information for helping people.

In some other embodiments, the display interface is a screen component installed on the refrigerator. Consequently, the user standing in front of the refrigerator can directly view the screen component to understand the statuses or the freshness levels of the food items stored in the refrigerator without the need of additionally using the user device or the mobile electronic device.

From the above descriptions, the present invention provides a food status recognition and display system and a food status recognition and display method for the food status recognition and display system. The technologies of the present invention are more advantageous over the conventional technologies. Firstly, the camera of the camera and light source module uses a wide-angle lens or a fisheye lens to capture images with a larger field of view or a larger imaging area. Since the use of the single lens module is sufficient to implement the multi-band sensing function, the installation cost of the overall system is effectively saved. Secondly, the system and method of the present invention analyze the food photography result through the vegetation index formula, the vegetation water content formula and the vegetation correlation analysis formula. Consequently, the freshness levels, the statuses or the realities of the vegetables or fruits can be recognized more accurately. Thirdly, the architecture of the food status recognition and display system of the present invention can be applied to smart refrigerators. In addition, this architecture can be applied to the food exhibition areas in supermarkets, traditional markets or stores. When people need to choose and purchase food items, useful food status information will be provided for reference.

In other words, the food status recognition and display system and the food status recognition and display method of the present invention are capable of effectively overcoming the drawbacks of the conventional technologies and achieving the purposes of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A food status recognition and display system, comprising:

a camera and light source module facing a food storage environment, wherein the camera and light source module photographs at least one food item in the food storage environment by using light beams in a visible light band, a near-infrared light band, and a short-wave infrared light band, so that the respective food photography results are generated;

a processor receiving the food photography results, wherein after the processor processes and analyzes the food photography results through an image recognition process, a vegetation index formula, a vegetation water content formula, and a vegetation correlation analysis formula, at least one corresponding food status information is generated and then transmitted; and a display interface receiving the at least one food status information, wherein the at least one food status information is shown on the display interface so as to be viewed;

wherein the food photography results include a near-infrared light image signal and a short-wave infrared light image signal, wherein a vegetation water content is obtained through the vegetation water content formula after a value of the near-infrared light image signal minus the short-wave infrared light image signal is divided by a value of the near-infrared light image signal plus the short-wave infrared light image signal.

2. The food status recognition and display system according to claim 1, wherein the food status recognition and display system further comprises a refrigerator, and the food storage environment is formed in the refrigerator, wherein the camera and light source module faces the food storage environment, the camera and light source module is disposed within the refrigerator, the processor is in communication with the camera and light source module, and the processor is installed in the refrigerator.

3. The food status recognition and display system according to claim 2, wherein the food status recognition and display system further comprises a user device, and the display interface is installed on the user device, wherein the refrigerator further comprises a network transmitter, and the network transmitter is in communication with the processor, wherein after the network transmitter receives the at least one food status information, the at least one food status information is transmitted from the network transmitter to the user device in a wired transmission manner or a wireless transmission manner.

4. The food status recognition and display system according to claim 1, wherein the camera and light source module comprises a wide-angle lens module or a fisheye lens module.

5. The food status recognition and display system according to claim 1, wherein the camera and light source module comprises a visible light source, a near-infrared light source, a short-wave infrared light source, a visible light sensing chip, a near-infrared light sensing chip and a short-wave infrared light sensing chip, wherein the camera and light source module senses the at least one food item using the light beams in the visible light band, the near-infrared light band and the short-wave infrared light band, so that the respective food photography results are generated.

6. The food status recognition and display system according to claim 1, wherein the camera and light source module comprises an integrated multi-spectral sensing chip that integrates the sensing functions in the visible light band, the near-infrared light band and the short-wave infrared light band.

7. The food status recognition and display system according to claim 1, wherein the food photography results include a visible light image signal, wherein when the image recognition process is performed, the visible light image signal is loaded, and the visible light image signal is subjected to image correction and extraction and classified into one or more regions of interest in a default model, so that a name of the at least one food item corresponding to a content of the visible light image signal is determined.

8. The food status recognition and display system according to claim 1, wherein the food photography results include a near-infrared light image signal and a red light image signal, wherein a vegetation index is obtained through the vegetation index formula after a value of the near-infrared light image signal minus the red light image signal is divided by a value of the near-infrared light image signal plus the red light image signal.

9. The food status recognition and display system according to claim 8, wherein if a difference between 1 and the vegetation index falls within a specified range, the corresponding food status information represents a high freshness level of a food status, wherein if the difference between and the vegetation index is beyond the specified range, the corresponding food status information represents a low freshness level of the food status.

10. The food status recognition and display system according to claim 1, wherein if a difference between 1 and the vegetation water content falls within a specified range, the corresponding food status information represents a high freshness level of a food status, wherein if the difference between 1 and the vegetation water content is beyond the specified range, the corresponding food status information represents a low freshness level of the food status.

11. The food status recognition and display system according to claim 1, wherein the food photography results include a near-infrared light image signal and a red light image signal, wherein a vegetation index is obtained through the vegetation index formula after a value of the near-infrared light image signal minus the red light image signal is divided by a value of the near-infrared light image signal plus the red light image signal.

12. The food status recognition and display system according to claim 11, wherein the vegetation correlation analysis formula is related to a correlation analysis about the vegetation index and the vegetation water content, and a vegetation correlation coefficient is obtained through the vegetation correlation analysis formula.

13. The food status recognition and display system according to claim 12, wherein if a difference between 1 and the vegetation correlation coefficient falls within a specified range, there is a positive correlation between the vegetation index and the vegetation water content.

14. The food status recognition and display system according to claim 1, wherein the food status recognition and display system further comprises a user device, wherein the camera and light source module, the processor and the display interface are installed on the user device, and the food storage environment is a food exhibition area.

\* \* \* \* \*